US006902303B2

(12) United States Patent
Lee

(10) Patent No.: US 6,902,303 B2
(45) Date of Patent: Jun. 7, 2005

(54) RE-LAMPING ARRANGEMENT FOR HALOGEN WORKLIGHT

(75) Inventor: Wade Lee, Danville, CA (US)

(73) Assignee: EML Technologies LLC, Danville, CA (US)

( * ) Notice: Subject to any disclaimer, the term of this patent is extended or adjusted under 35 U.S.C. 154(b) by 22 days.

(21) Appl. No.: 10/222,097

(22) Filed: Aug. 16, 2002

(65) Prior Publication Data

US 2004/0032726 A1 Feb. 19, 2004

(51) Int. Cl.[7] .................................................. B60Q 3/04

(52) U.S. Cl. ........................ 362/362; 362/376; 362/375; 362/399; 362/400

(58) Field of Search ................................. 362/362, 376, 362/399, 400, 263, 375, 274, 223

(56) References Cited

U.S. PATENT DOCUMENTS

| | | | | |
|---|---|---|---|---|
| 2,165,562 A | | 7/1939 | Mack et al. | 206/223 |
| 4,228,489 A | | 10/1980 | Martin | 362/250 |
| D298,467 S | | 11/1988 | Stover | D26/63 |
| 4,868,727 A | | 9/1989 | Ponds et al. | 362/344 |
| 5,195,823 A | | 3/1993 | Sidabras | 362/387 |
| 5,205,645 A | | 4/1993 | Lee | 362/431 |
| 5,243,507 A | * | 9/1993 | Atkins et al. | 362/376 |
| D345,025 S | | 3/1994 | Tsao | D26/63 |
| D345,226 S | | 3/1994 | Tsao | D26/63 |
| 5,307,255 A | | 4/1994 | Chen | 362/410 |
| D349,972 S | | 8/1994 | Stekelenburg | D26/60 |
| 5,386,358 A | | 1/1995 | Hillinger | 362/431 |
| D355,502 S | | 2/1995 | Liao | D26/67 |
| D360,952 S | | 8/1995 | Lee | D26/60 |
| 5,448,463 A | | 9/1995 | Leen | 362/396 |
| 5,455,756 A | | 10/1995 | Sumer et al. | 362/376 |
| D369,227 S | | 4/1996 | Sumer | D26/63 |
| 5,510,970 A | | 4/1996 | Hollenback et al. | 362/396 |
| D375,377 S | | 11/1996 | Leen | D26/63 |
| D381,114 S | | 7/1997 | Xu | D26/140 |
| D385,640 S | | 10/1997 | Leen | D26/63 |
| D388,209 S | | 12/1997 | Grossman et al. | D26/63 |
| 5,695,278 A | * | 12/1997 | Grossman et al. | 362/374 |
| D400,290 S | | 10/1998 | Hart | D26/119 |
| 5,845,989 A | | 12/1998 | Leen | 362/410 |
| 5,984,490 A | | 11/1999 | Leen | 362/240 |
| D436,680 S | | 1/2001 | Leen | D26/65 |
| 6,328,460 B1 | * | 12/2001 | Grossman et al. | 362/427 |
| 6,354,720 B2 | * | 3/2002 | Grossman et al. | 362/427 |

* cited by examiner

*Primary Examiner*—Sandra O'Shea
*Assistant Examiner*—Bertrand Zeade
(74) *Attorney, Agent, or Firm*—Elliot B. Aronson

(57) ABSTRACT

A halogen worklight of the type having a peripheral frame or bezel that is completely removable to provide access to the bulb chamber for re-lamping. The peripheral frame is provided with a handle secured directly to the bezel for use in removing the bezel and for positioning the bezel when re-mounting it to the worklight body. The handle may be changed from one side of the bezel to the other to convert the worklight between right and left-handed.

4 Claims, 2 Drawing Sheets

RE-LAMPING ARRANGEMENT FOR HALOGEN WORKLIGHT

BACKGROUND OF THE INVENTION

The present invention relates to halogen worklights and is more particularly directed to arrangements for opening the worklight to replace a halogen bulb.

Halogen worklights have become popular for use in such varied settings as construction jobs, industrial plants, automotive and auto body repair shops, artist and photographic studios, and projects around the home. Such worklights are typically operated at the nominal voltage of the electric utility mains (typically 120 Volts in the United States) at power levels ranging from around 150 Watts at the low end to 600 Watts or greater in a single lamp housing. The halogen bulbs themselves have a comparatively high operating temperature, and consequently in such an operating environment it is not uncommon for them to burn out and have to be replaced from time to time—an operation commonly referred to as re-lamping.

Typical halogen worklights have a lamp housing with an interior bulb chamber that is lined with an internal reflecting surface, in front of which are disposed one or more halogen bulbs. The housing is formed with an exit window through which the light is projected by the reflecting surface. The housing is frequently box-shaped although other shapes are possible, such as a truncated conical shape, and the exit window is often rectangular although circular or oval shapes are also found. The exit window is covered by a protective glass shield, in front of which extends a protective grill. A typical such worklight is shown in U.S. Pat. No. 5,243,507 of Atkins et al.

A number of constructions are known for permitting the lamp housing to be opened for re-lamping through the exit window. In some models the glass shield, or the glass shield and protective grill, are mounted in a sturdy peripheral frame, commonly referred to as a bezel, which is secured to the lamp housing about the exit window. See, for example, U.S. Pat. Nos. 5,448,463 of Leen; 5,455,756 of Sumer et al.; 5,205,645 of Lee; D349,972 of Stekelenburg; 5,195,823 of Sidabras; D355,502 of Liao; D345,226 of Tsao; D375,377 of Leen; D385,640 of Leen; 5,695,278 of Grossman et al.; and 5,845,989 of Leen. In some of these constructions the bezel is completely removable from the housing to permit unobstructed access to the bulb in the bulb chamber. In other constructions the bezel is rotatably secured to the housing so that it may be rotated or pivoted to an open position permitting such access. In yet other constructions no bezel is used at all. Instead the protective shield and grill are held on by clips. See, for example, U.S. Pat. Nos. 4,868,727 of Ponds et al. and 5,243,507 of Atkins et al.

Such halogen worklight designs face the common problem that the worklight body, bezel, protective shield, and/or grill can get particularly hot during use, and users are often anxious to re-lamp before the worklight has sufficiently cooled.

SUMMARY OF THE INVENTION

The present invention provides an improvement in the ease, convenience and comfort with which a halogen worklight may be re-lamped. It is operable with a halogen worklight of the type having a bezel which is completely removable to provide access to the bulb chamber for re-lamping. The improvement is achieved through the unexpected expedient of providing a handle secured directly to the bezel for use in removing the bezel and for positioning the bezel when re-mounting it to the worklight body.

A handle on the bezel is found to provide for enhanced manipulability and comfort during the re-lamping process; it helps to avoid undesirable contact with a potentially hot protective grill or glass shield; it enables the natural force of gravity to assist in opening the bulb chamber as the bezel is loosened; it encourages the user to set the bezel down on the grill side instead of on the unprotected inside surface of the protective glass shield that can be very hot and that may be subject to becoming soiled, marred or otherwise degraded when laid face down in the working environment.

Other aspects, advantages, and novel features of the invention are described below or will be readily apparent to those skilled in the art from the following specifications and drawings of illustrative embodiments.

DETAILED DESCRIPTION OF ILLUSTRATIVE EMBODIMENTS

Figure 1:
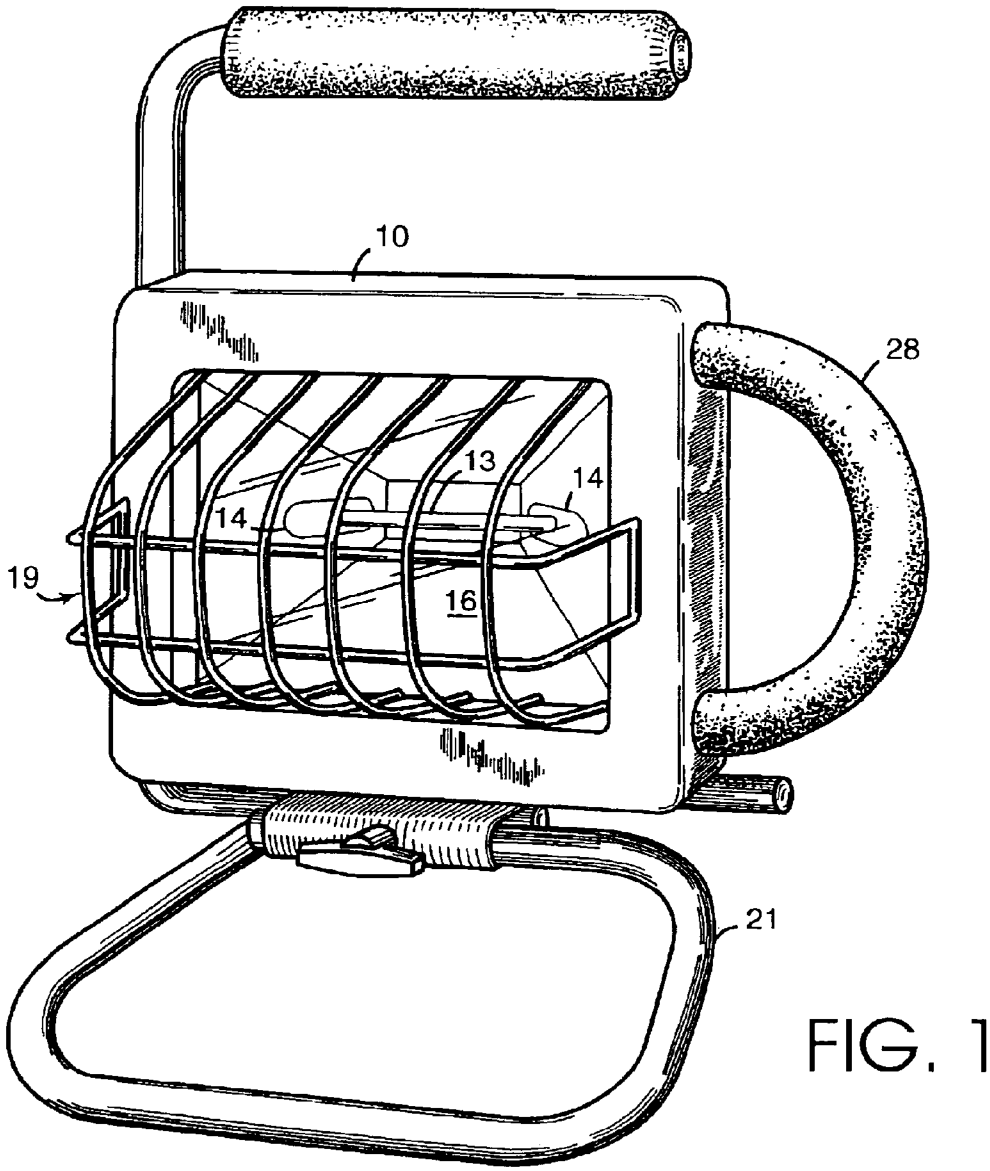
FIG. 1 is a front perspective view of a worklight embodiment with bezel side handle according to the invention.
Figure 2:
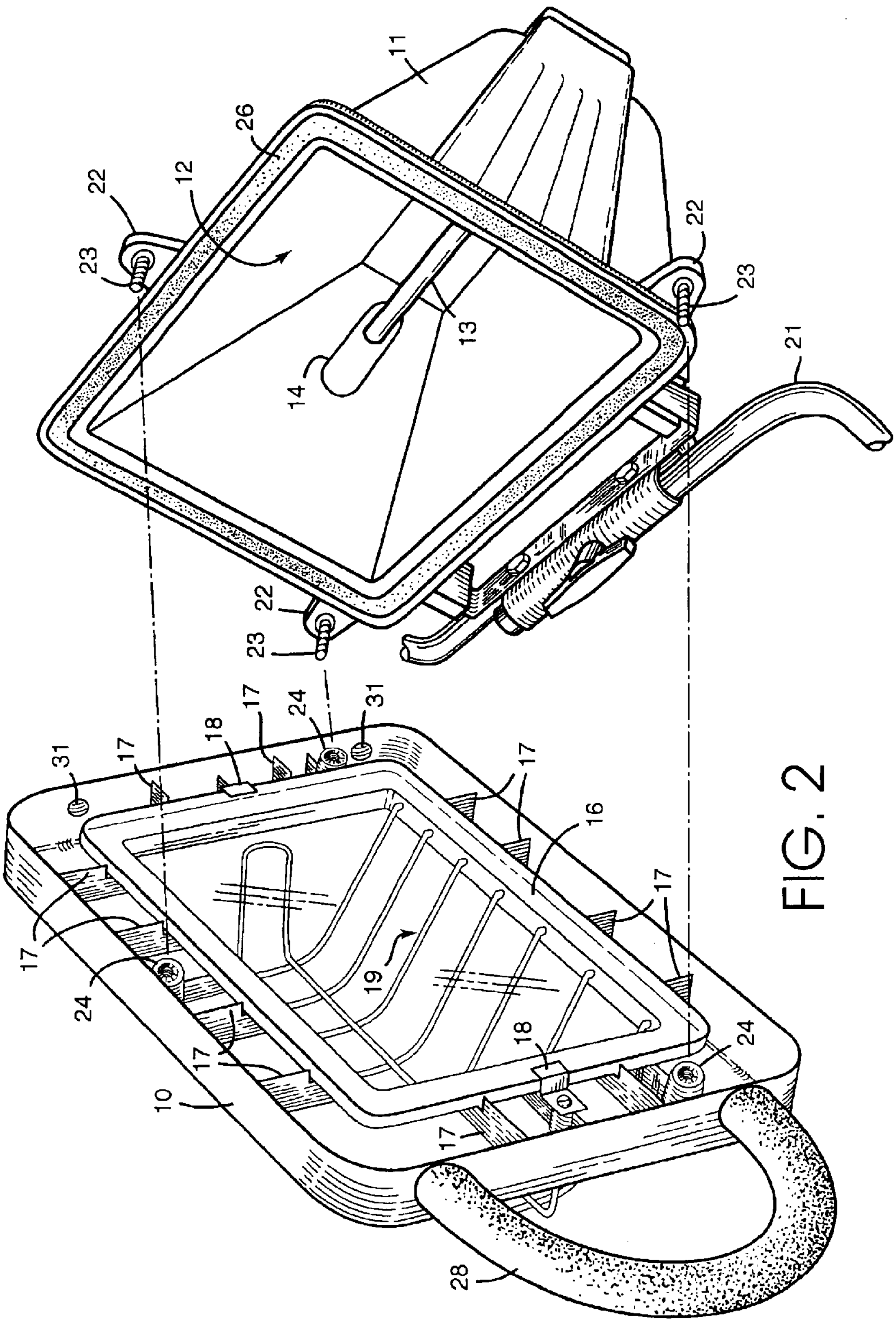
FIG. 2 is a perspective view of the worklight of FIG. 1 in an open configuration ready for re-lamping.

FIGS. 1 and 2 show an overall view of a halogen worklight having a front peripheral frame or bezel 10 and a main body 11 defining a light bulb chamber 12 that includes an elongate halogen bulb 13 held in receiving sockets 14. The frame 10 holds a protective glass shield 16, which in the illustrated embodiment is held in frame 10 against a plurality of positioning ribs 17 by securing tabs 18. Extending in front of frame 10 is a metal protective grill 19 that is secured to frame 10. In the illustrated embodiment the worklight is supported on a base 21 forming a stand for setting the worklight on a work surface, although the invention may be utilized with worklights having any form of base such as a base for mounting on a tripod.

FIG. 2 shows frame 10 in a disposition completely removed from the worklight body so as to provide full, unobstructed access to bulb chamber 12 for replacing a burned out bulb. To secure the completely removable bezel to the worklight body, the body is provided with tabs 22 and threaded securement screws 23, and bezel 10 is provided with posts 24 that are tapped to receive screws 23. Each post is aligned with a corresponding securement screw on the worklight body as indicated in FIG. 2. By tightening screws 23 into receiving posts 24 the rim of protective glass shield 16 is pulled against gasket 26 on the worklight body to form a tight seal.

To open the bulb chamber for re-lamping, the securement screws are unscrewed from their respective posts and the bezel is pulled away from the worklight body. In halogen worklights of the prior art with completely removable bezels, this is typically accomplished by grasping the protruding protective grill 19 to steady the worklight while the screws are loosened and then pulling on the grill to separate the bezel from the worklight body. The bezel is then set down, often on the inside face of glass shield 16 since the user is holding the grill on the opposite side of the glass shield.

The invention improves upon this process, making it easier and more comfortable for the user by providing a handle 28 secured to bezel 10, with the following benefits and advantages. A bezel grasped at handle 28 is grasped at a different position with respect to the center of gravity than one grasped at grill 19. The center of gravity of the bezel with protective grill generally lies somewhat in front of the front face of the bezel itself, that is, between the front face of the bezel and the foremost tip of the grill. As a result, when the bezel is grasped by the handle a torque is generated about the handle by the pull of gravity tending to rotate the bezel such that the top is urged away from the worklight body and the bottom is urged toward the worklight body. When screws 23 are released, and the user starts to pull the bezel away from the worklight body, the top edge of the bezel will tend to pull away from the worklight body and the bottom bezel edge will be urged against the worklight body. The result is that, perhaps with an initial slight tug or twist on the bezel handle, the bulb chamber essentially "falls open" under the natural influence of gravity. That is to say, positioning a handle on the bezel effectively brings the force of gravity into play to help open the worklight. While the assist may be small, it is nevertheless an assist that has not previously been appreciated and is realized here through the unlikely means of a handle positioned directly on the bezel.

Moreover, when the bezel preferentially falls away at the top edge, the bulb chamber opens initially along the top edge instead of along all edges as happens when the user grasps the grill and pulls the two sides apart. If the user has set about re-lamping the worklight too soon, before the worklight has adequately cooled, this releases a concentrated surge of hot air upward that will gently be felt by the user who will typically be poised over the worklight while attending to the re-lamping, thereby providing a thermally palpable cautionary reminder that the worklight body and/or chamber may still be hot to the touch.

Still further, because of the tendency of gravity to rotate the grill downward, the user will typically be found holding the removed bezel with the grill facing downward and will therefore tend to set the bezel down on the grill rather than on the glass shield which is exposed on the opposite side of the bezel. This protects the glass shield from possible damage or soiling if set down on sharp or abrasive objects or on oily or greasy objects as often may be found in the work environment. It also protects against damage to objects in the work environment that could result from contact with the glass shield, which may be extremely hot if the worklight has not been given adequate time to cool.

Figure 3:
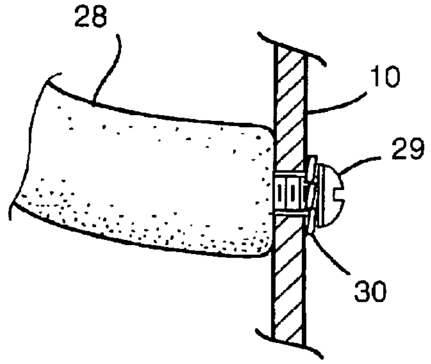
FIG. 3 is an elevational view of a handle end secured to a side of the bezel.

In the embodiment of FIGS. 1 and 2, handle 28 is secured directly to one side of the bezel. The handle in this embodiment takes the form of curved tubing with a protective foam material or other thermally insulating covering. Other shapes, such as curvilinear, angular, or straight shapes, may also be used. The handle may alternatively be secured to the top or to the other side of the bezel and may be so shaped, if desired, that it need be secured at only one end if desired. The handle may also be formed integrally with the bezel. Although handle 28 may be secured to the bezel in any manner, an advantage results if it is secured by means of a releasable connector such as screw 29 and lock washer 30 visible in FIG. 3. For the convenience of left-handed users the bezel may be provided with a second mounting, here a second set of mounting holes, for handle 28 on the opposite side of the bezel. The handle may then be positioned on the left side of the bezel. In FIG. 2 the second set of mounting holes are filled with plugs 31. The worklight may be converted from right-handed to left-handed at the selection of the user by releasing the connectors 29, moving the handle from one side to the other, reattaching the connectors, and moving the plugs to the first side.

It should be noted that while the present worklight may appear to differ only slightly from worklights of the prior art, the difference brings about an unexpected improvement in ease of use and user convenience that has heretofore escaped the attention of those of ordinary skill in the art.

The above descriptions and drawings are given to illustrate and provide examples of various aspects of the invention in various embodiments. It is not intended to limit the invention only to these examples and illustrations. For example, other forms of bolts, bayonet type fasteners, clips, clamps or the like may be used instead of the illustrated screws 23 and posts 24 for releasably securing the bezel to the worklight body, and all such arrangements are considered to fall within the scope of the invention. Given the benefit of the above disclosure, those skilled in the art may be able to devise various modifications and alternate constructions that although differing from the examples disclosed herein nevertheless enjoy the benefits of the invention and fall within the scope of the invention as defined by the following claims.

What is claimed is:

1. A halogen worklight having a main body including a chamber for at least one halogen bulb and having a frame around the front of the chamber, characterized in that:

said frame and said main body are structured and arranged such that said frame is complete removable from said main body in the normal course of re-lamping the worklight so as to provide access to said chamber for re-lamping unobstructed by said frame: and said frame includes a handle secured thereto for removal of said frame from said main body.

2. The apparatus of claim 1 wherein said handle is secured to a side of said frame.

3. The apparatus of claim 1 wherein said frame is structured for said handle to be mounted thereon at two sides thereof; and said handle ha removably secured to said frame, whereby said handle is positionable at either side of the frame at the selection of a user.

4. The apparatus of claim 3 wherein said frame is provided with mounting holes on two sides thereof, and said handle is secured to said frame with releasable connectors extending through said mounting holes.

* * * * *